(12) United States Patent
Vinciarelli et al.

(10) Patent No.: US 6,434,005 B1
(45) Date of Patent: Aug. 13, 2002

(54) POWER CONVERTER PACKAGING

(75) Inventors: Patrizio Vinciarelli, Boston, MA (US); Fred M. Finnemore, Jefferson, ME (US); Michael B. Lafleur, East Hampstead, NH (US); Charles I. McCauley, Tewksbury, MA (US)

(73) Assignee: VLT Corporation, San Antonio, TX (US)

( * ) Notice: Subject to any disclaimer, the term of this patent is extended or adjusted under 35 U.S.C. 154(b) by 0 days.

(21) Appl. No.: 09/698,503

(22) Filed: Oct. 27, 2000

(51) Int. Cl.⁷ .................................................. H05K 7/20
(52) U.S. Cl. .................. 361/704; 29/890.03; 165/80.2; 165/185; 257/722; 361/710; 361/715; 361/761 361/719; 361/720; 363/141; 363/143
(58) Field of Search ...................... 29/890.03; 185/80.2, 185/185; 174/260, 16.3, 261; 228/179.1, 180.1; 257/722, 723, 724, 706–709, 712–715; 361/690, 704, 707, 719–720, 761, 763, 764, 784, 785, 790, 803; 363/141, 21, 143

(56) References Cited

U.S. PATENT DOCUMENTS

| | | |
|---|---|---|
| 2,917,678 A | 12/1959 | Tepper |
| 3,205,408 A | 9/1965 | Boehm et al. |
| 3,621,338 A | 11/1971 | Rogers et al. |
| 3,683,241 A | 8/1972 | Duncan |
| 4,138,711 A | 2/1979 | Bremenour et al. |
| 4,400,762 A | 8/1983 | Bartley et al. |

(List continued on next page.)

FOREIGN PATENT DOCUMENTS

| | | |
|---|---|---|
| EP | 0 141 582 | 5/1985 |
| EP | 0 674 474 | 9/1995 |
| GB | 2 214 731 | 6/1989 |
| JP | 50-48579 | 5/1975 |
| JP | 63-146940 | 9/1988 |
| JP | 1-73966 | 5/1989 |
| JP | 2-142173 | 5/1990 |
| JP | 2-151095 | 6/1990 |
| JP | 2-129766 | 10/1990 |
| JP | 3-29389 | 2/1991 |
| JP | 3-163893 | 7/1991 |
| JP | 4-33278 | 2/1992 |
| JP | 5-315192 | 11/1993 |
| JP | 6-509686 | 10/1994 |
| JP | 7-143747 | 6/1995 |

OTHER PUBLICATIONS

Gates and Yokoro, "Sealed Chip–on–board Circuit Protection", 3rd International SAMPE Electronics Conference, pp. 929–938, Jun. 1989.

Lambda Electronics, Inc. —The new RM Series telecommunications power modules (brochure) Sep. 1995.

Primary Examiner—Gregory Thompson
(74) Attorney, Agent, or Firm—Fish & Richardson P.C.

(57) ABSTRACT

A power converter includes a housing, heat generating circuitry in the housing, and a heat conducting metal sheath on the outside of the housing. The housing has an elongated-box shape including two relatively smaller ends and four relatively larger sides and a heat-conducting metal sheath on the outside of the housing. The heat conducting sheath covers substantially all of the four relatively larger sides.

20 Claims, 6 Drawing Sheets

U.S. PATENT DOCUMENTS

| | | |
|---|---|---|
| 4,417,296 A | 11/1983 | Schelhorn |
| 4,479,686 A | 10/1984 | Hoshino et al. |
| 4,531,145 A | 7/1985 | Wiech, Jr. |
| 4,551,746 A | 11/1985 | Gilbert et al. |
| 4,551,747 A | 11/1985 | Gilbert et al. |
| 4,603,927 A | 8/1986 | Gardner |
| 4,603,929 A | 8/1986 | Fitzpatrick |
| 4,622,621 A | 11/1986 | Barre |
| 4,685,753 A | 8/1987 | Isshiki et al. |
| 4,724,283 A | 2/1988 | Shimada et al. |
| 4,740,414 A | 4/1988 | Shaheen |
| 4,741,472 A | 5/1988 | Barmann |
| 4,750,089 A | 6/1988 | Derryberry et al. |
| 4,769,525 A | 9/1988 | Leatham |
| 4,783,695 A | 11/1988 | Eichelberger et al. |
| 4,783,697 A | 11/1988 | Benenati et al. |
| 4,847,136 A | 7/1989 | Lo |
| 4,879,630 A | 11/1989 | Boucard et al. |
| 4,918,811 A | 4/1990 | Eichelberger et al. |
| 4,953,005 A | 8/1990 | Carison et al. |
| 4,959,750 A | 9/1990 | Cnyrim et al. |
| 4,975,824 A | 12/1990 | Huss et al. |
| 4,994,215 A | 2/1991 | Wiech, Jr. |
| 5,006,673 A | 4/1991 | Freyman et al. |
| 5,019,941 A | 5/1991 | Craft |
| 5,019,946 A | 5/1991 | Eichelberger et al. |
| 5,028,987 A | 7/1991 | Neugebaner et al. |
| 5,184,281 A * | 2/1993 | Samarov et al. ............ 361/704 |
| 5,200,884 A | 4/1993 | Ohashi |
| 5,249,971 A | 10/1993 | Lai et al. |
| 5,352,851 A | 10/1994 | Wallace et al. |
| 5,365,403 A | 11/1994 | Vinciarelli et al. |
| 5,394,300 A | 2/1995 | Yoshimura |
| 5,742,478 A * | 4/1998 | Wu ......................... 3621/704 |
| 5,909,358 A * | 6/1999 | Bradt ........................ 361/707 |
| 5,926,367 A * | 7/1999 | Dutierrez et al. ............ 361/715 |
| 6,000,125 A | 12/1999 | Kang |
| 6,031,726 A | 2/2000 | Vinciarelli et al. |
| 6,068,051 A * | 5/2000 | Wendt ....................... 361/720 |
| 6,208,531 B1 * | 3/2001 | Vinciarelli et al. ........... 363/21 |

\* cited by examiner

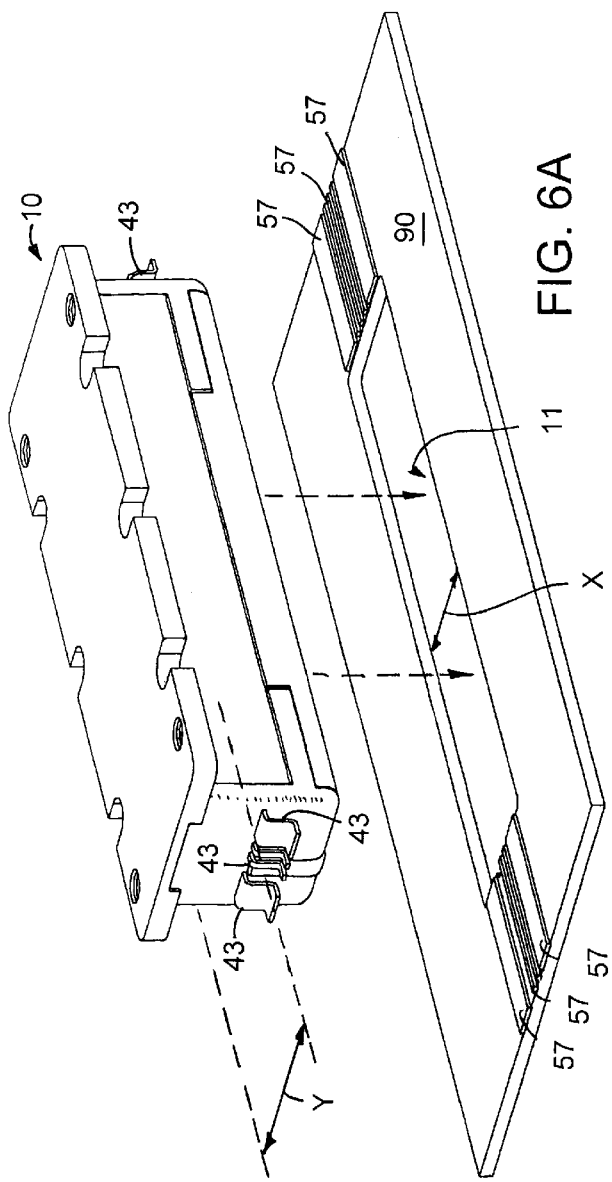
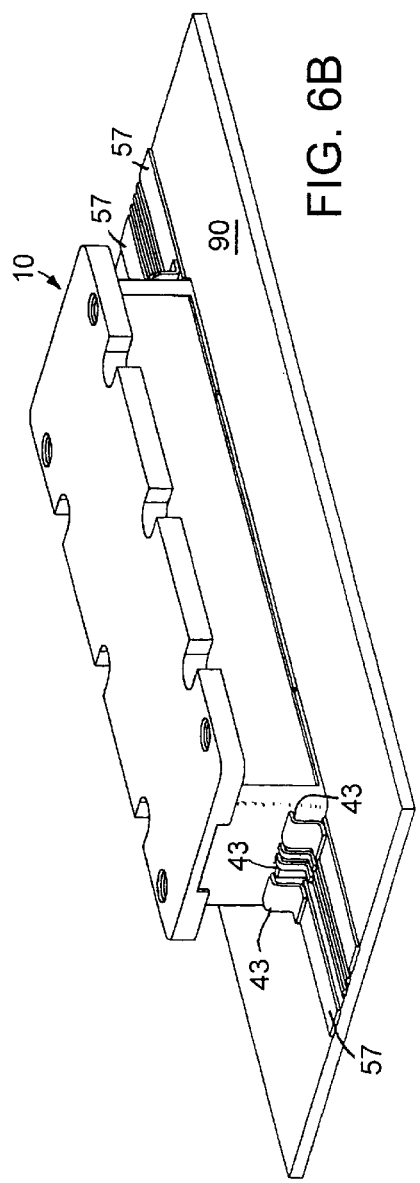

POWER CONVERTER PACKAGING

BACKGROUND

This invention relates to power conversion packaging.

U.S. Pat. No. 6,031,726, issued Feb. 29, 2000, and incorporated by reference, shows a packaging arrangement for a small, high-power-density power converter in which a primary-side converter piece and a secondary-side converter piece mate to form the converter. The two pieces house populated circuit boards in an encapsulant. Each of the circuit boards supports one winding of a main power conversion transformer, and a hole in the encapsulant passes through the center of the winding. After the two pieces are mated, two u-shaped core pieces are inserted through the holes to complete the transformer. At the bottom of the converter, lead frames carry signals and power from the encapsulated circuit boards' terminals at the ends of the converter. A heat-sink sleeve slips over the assembly to complete the converter. The finished converter is mounted on an external circuit board with the terminals soldered to conductive runs on the surface of the board and a portion of the body lying in a rectangular hole in the circuit board for efficient use of space.

SUMMARY

In general, in one aspect, the invention features a power converter that includes a housing, heat generating circuitry in the housing, and a heat conducting metal sheath on the outside of the housing. The housing has an elongated-box shape including two relatively smaller ends and four relatively larger sides, and a heat-conducting metal sheath on the outside of the housing, The heat conducting sheath covers substantially all of the four relatively larger sides.

Implementations of the invention may include one or more of the following features. The metal sheath may be a longitudinally extruded piece that includes fins that run along the length of the box shape. The metal sheath may include two pieces, one of the pieces covering substantially all of three of the relatively larger sides, the other of the pieces covering substantially all of the fourth of the relatively larger sides. At least a portion of the sheath may include a solderable metal surface. Terminals may project from at least one of the smaller ends and be configured to be soldered to conductive runs on a surface of a printed circuit board. The heat conducting metal sheath may have a solderable surface configured and oriented to be soldered to the surface of the printed circuit board when the terminals are soldered to the conductive runs. The other of the pieces may form one of the four relatively larger sides of the housing. The one piece may include three separate sub-pieces that are respectively mounted on each of three of the larger sides.

In general, in another aspect, the invention features an assembly that includes a circuit board having an aperture and a power converter in the shape of an elongated box. The power converter is mounted on the circuit board with a portion of the power converter lying in the aperture. The power converter has a heat sink that surrounds four longer sides of the elongated box and terminals that project from ends of the power converter and are soldered to conductive runs on the surface of the circuit board. There are heat conductive connections between portions of the heat sink and the circuit board.

In general, in another aspect of the invention, a series of power converters are made on a manufacturing line, each of the power converters including a heat sink selected from among a set of different kinds of heat sinks and a core converter. The manufacturing line is configured to enable lot-of-one mixing of power converters in which each power converter in the series may have a different one of the available heat sinks.

Implementations of the invention may include one or more of the following features. The different kinds of heat sinks may differ at least in their capacities for sinking heat, or in their sizes. The core converters of all of the power converters may be the same. The core converters of at least some of the power converters may be selected from among different available kinds of converters.

In general, in another aspect the invention features a power converter having a box-shaped housing having two ends and four sides and heat-generating electronic circuitry held in the housing. Heat-conducting metal shields span substantially all of two opposing sides of the housing. A mounting mechanism attaches the converter to a circuit board in a position in which one of the heat conducting metal shields lies to one side of the circuit board and the other metal shield lies to the other side of the circuit board.

In general, in another aspect, the invention features a method comprising providing an external heat sinking surface on a power converter, and connecting the heat sinking surface to a substrate external to the power converter.

Implementations of the invention may include one or more of the following features. The substrate may include a printed circuit board. The heat sinking surface may be connected to the substrate by soldering or by thermally conductive adhesive. The heat sink may be plated with nickel. The substrate may include a printed circuit board having a conductive pattern on its surface and the heat sinking surface may be soldered to the conductive pattern.

Other advantages and features of the invention will become apparent from the following description and from the claims.

DESCRIPTION

FIGS. 6A and 6B show a converter being mounted into an aperture in a circuit board.

Figure 1:
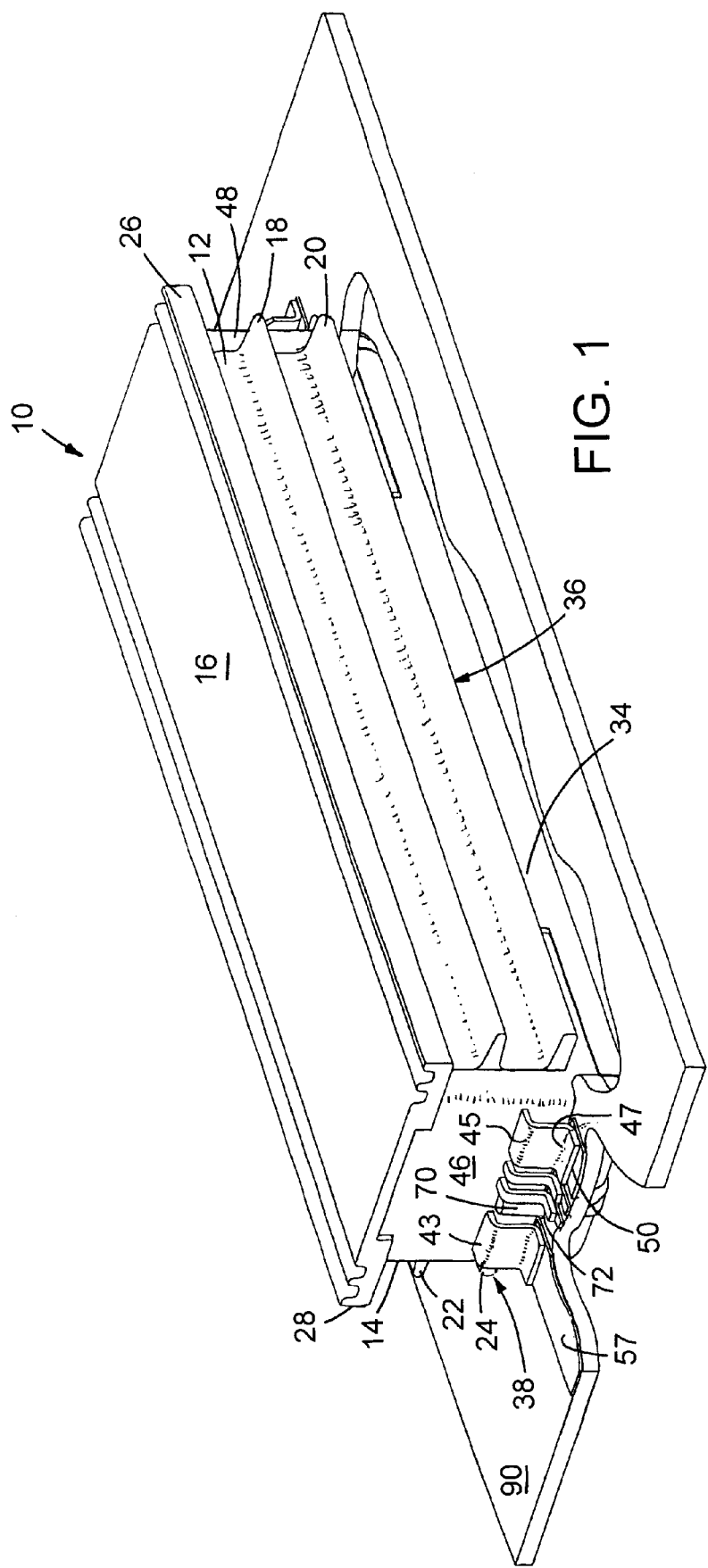
FIG. 1 is a perspective view of a converter mounted in a partially broken-away circuit board.
Figure 2:
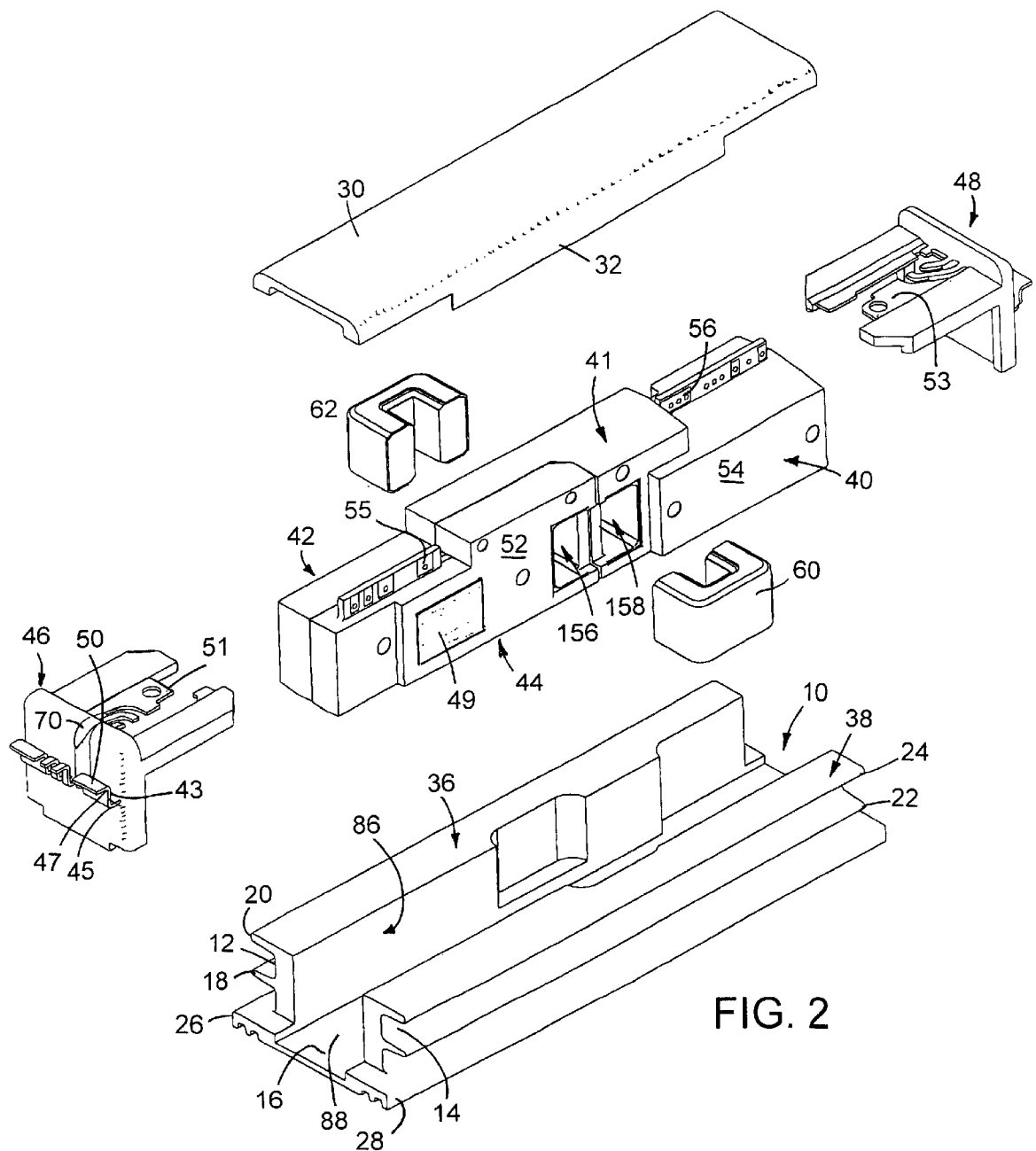
FIG. 2 is an exploded view of the converter of FIG. 1.

As shown in FIGS. 1 and 2, in an improvement of the converter shown in U.S. Pat. No. 6,031,726, the heat sink 10 is a long extruded piece of aluminum that is plated with nickel after extrusion. The heat sink has two sides 12, 14 and a bridge 16 that meet to form a unshaped extrusion. Each side 12, 14 has two fins 18, 20, and 22, 24 that run along the length of the extrusion. The bridge 16 has two fins 26, 28, each of which has two smaller fins that project upwardly. Together the fins increase the dissipation of heat from the heat sink into the ambient air.

The bottom of the converter is an extruded aluminum lid 30 that extends the length of the converter. The lid has two side flaps 32, 34, that meet the lower edges 36, 38 of the sides of the heat sink. Thus, substantially all of the four relatively longer side walls 40, 41, 42, 44 of the converter are sheathed in metal that sinks heat dissipated by the internal components of the converter. The heat sink is attached to the converter by soldering the inner surface of the nickel plated heatsink directly to metallized heat generating regions which are exposed at the surfaces of the side walls 42, 44 of the converter. For example, the primary-side piece 52 of the converter includes a power semiconductor (e.g., a MOSFET) which is mounted to one side of a ceramic substrate. The other side of the substrate is clad with copper and exposed (shown as region 49) on side wall 44. The inner surface of the heat sink is soldered to region 49 as well as to other exposed, metallized, surfaces on the opposite side wall 42. The lid is attached to the converter by means of thermally conductive epoxy which enhances the conduction of heat to the metal sheath formed by the heat sink and the lid.

On each end of the converter, electrical terminals 43 are held in two insert-molded terminal mounting blocks 46, 48. The terminals project from the ends of the converter and have two folds 45, 47 terminating in connection surfaces 50. The connection surfaces 50 are configured to be soldered to circuit runs 57 on the printed circuit board 90 on which the converter is mounted. The lower edges 36, 38 of the sides of the heat sink lie at the same level as the connection surfaces. Because the heat sink is plated with nickel, the lower edges of the heat sink can be soldered to conductive metal regions on the surface of the board. This enables heat to be more easily conducted from the heat sink to the circuit board, enhancing the overall flow of heat away from the converter.

The opposite ends of the terminals 51, 53 from the connection surfaces extend beneath the mated primary-side piece 52 and the secondary-side piece 54 of the converter and are configured to make contact with (and be soldered to) the connection pads 55, 56 that lie on projecting portions of the encapsulated circuit boards that are housed in the two mated pieces 52, 54. Each of the two mating pieces has a hole 156, 158 which passes through windings on the printed circuit boards that are encapsulated in the pieces. Two u-shaped core pieces 60, 62 are inserted through the holes to form the main transformer of the converter.

One of the molded terminal blocks has a key 70 between two of the terminals. The key mates with a slot 72 in the rectangular hole of a circuit board through which the converter is mounted to prevent inadvertent mounting in the wrong direction.

FIGS. 6A and 6B show a converter 10 being mounted into an aperture 11 in a circuit board 90. The tolerance in the positioning of the terminations 43 is no more than few thousandths of an inch relative to their nominal positions. Pads 57 on the circuit board can be located relative to the aperture 11 with similar accuracy. If the length and width of the aperture (the width of the aperture is marked X in FIG. 6A) are controlled to closely conform to the length and width of the body of the converter (the width of the body is marked Y in FIG. 6A), the terminations 43 will be properly aligned relative to the pads 57 when the converter is installed into the aperture.

Figure 3:
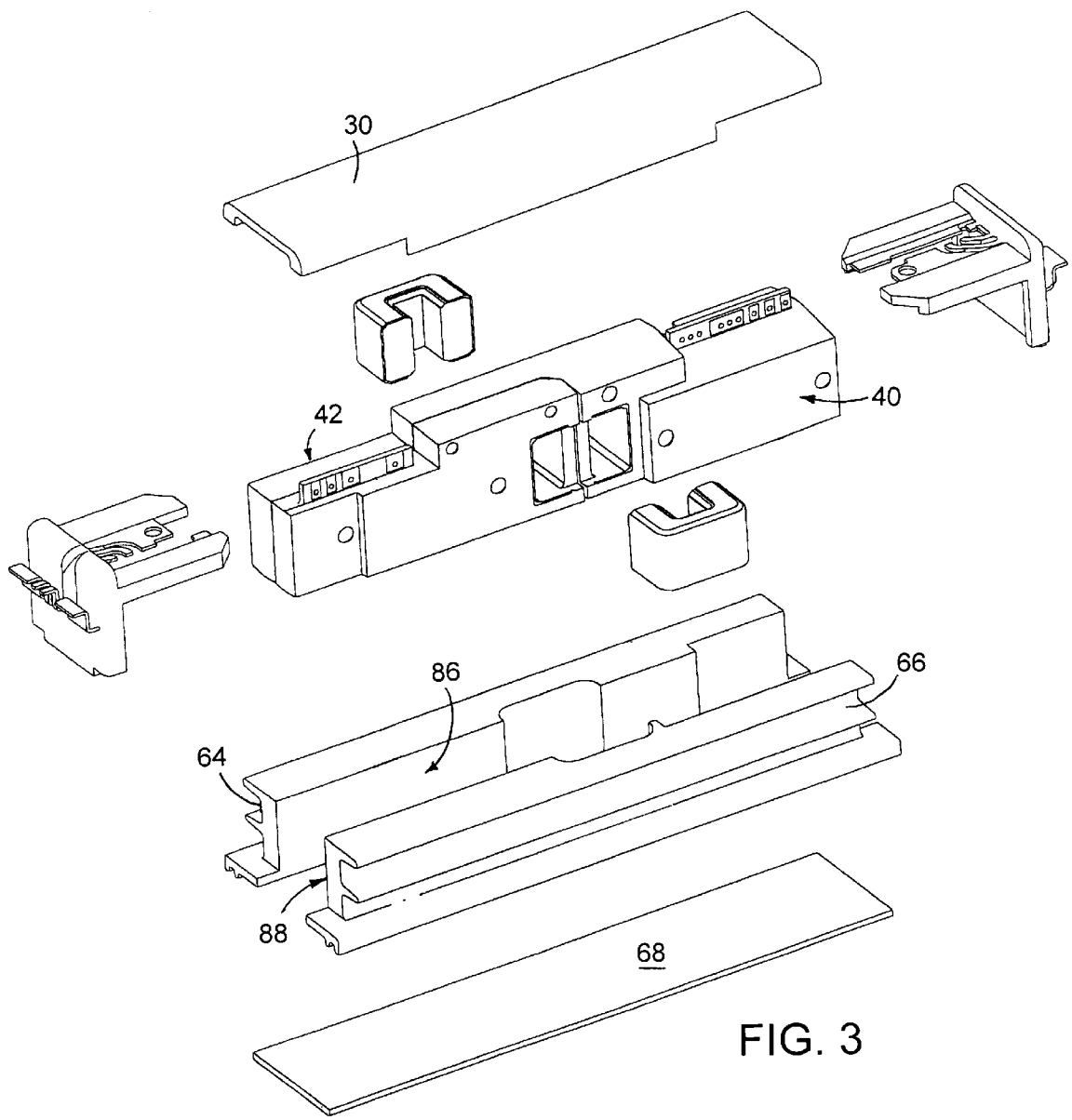
FIG. 3 is an exploded view of a converter.

The heat sink need not be made from a single extrusion but can be formed of two or three pieces that are fastened to the outer walls of the converter, as shown in FIG. 3. In the figure, the top piece 66 and two side pieces 64, 66 cover three sides of the converter and the lid 30 covers the fourth. One advantage of this arrangement is that the width of the gaps between the inner walls of the metal sides 86, 88 and the outer walls of the converter 40, 42 in the converter of FIG. 3 are more easily controlled than those in the converter of FIGS. 1 and 2, in which a single unshaped extrusion is used. Like the embodiment of FIG. 1, substantially all of the four long walls of the converter of FIG. 3 are sheathed in metal.

Figure 5:
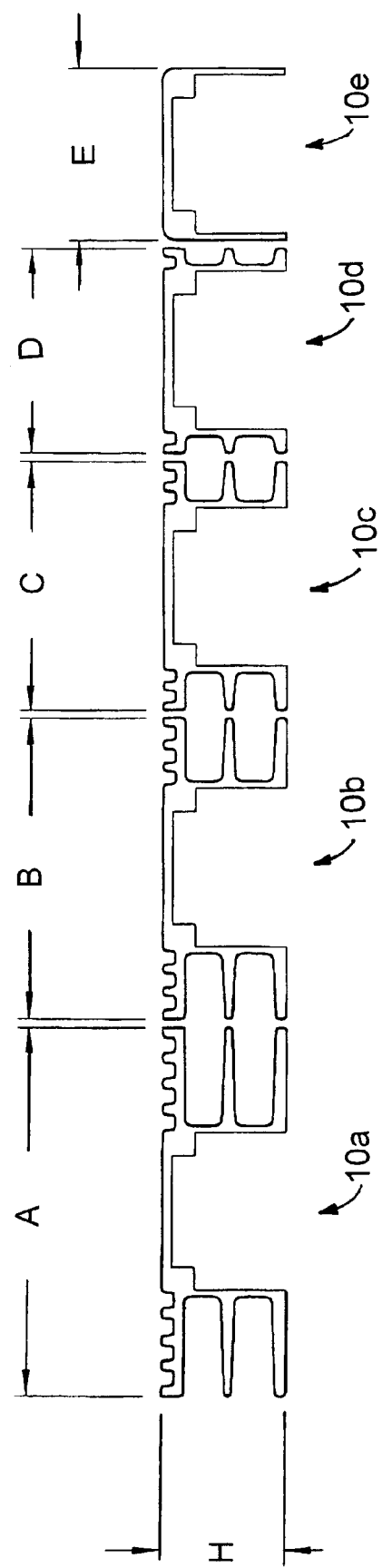
FIG. 5 shows cross-sectional views of heatsinks.

The number and configuration of the fins on the heat sink may be different than the ones shown in FIG. 1. For example, FIG. 5 shows cross-sectional views of five heat sink designs 10a–10e with differing fin heights. In the Figure, dimension H is 0.35", and dimensions A, B, C, D and E are, respectively, 1.075", 0.875", 0.725", 0.600" and 0.500". Each heat sink has progressively shorter fins with the last example, in FIG. 10e, having no fins at all. Likewise, the thickness and pitch of the fins can be modified to provide desired thermal performance. In general, longer fins and increased fin density result in reduced thermal resistance.

The heat sink configuration, and hence the overall volume occupied by the converter, in a particular application depends upon the temperature and flow rate of the cooling airstream, the amount of heat dissipated by the converter and the converter maximum operating temperature. For example, for a given set of operating and environmental conditions, the fin height required in a 1200 LFM air stream, and thus the overall volume occupied by the converter, will be lower than that required in a 300 LFM air stream. By providing a variety of heat sinks 10 (e.g., heat sinks 10a–10e, FIG. 5) for use with a common core converter design configuration (e.g., the combination of primary and secondary-side pieces 52, 54, mounting blocks 46, 48 and cores 60, 62) a customer can specify the smallest heat sink that provides the required thermal performance in a particular application, thereby minimizing wasted space. By providing supplies of different heat sinks on a manufacturing line, many identical (or even different) core converters can be mated in real time with different heat sinks, in varying size lots down to a "lot-of-one", to satisfy a variety of different customer applications.

Figure 4:
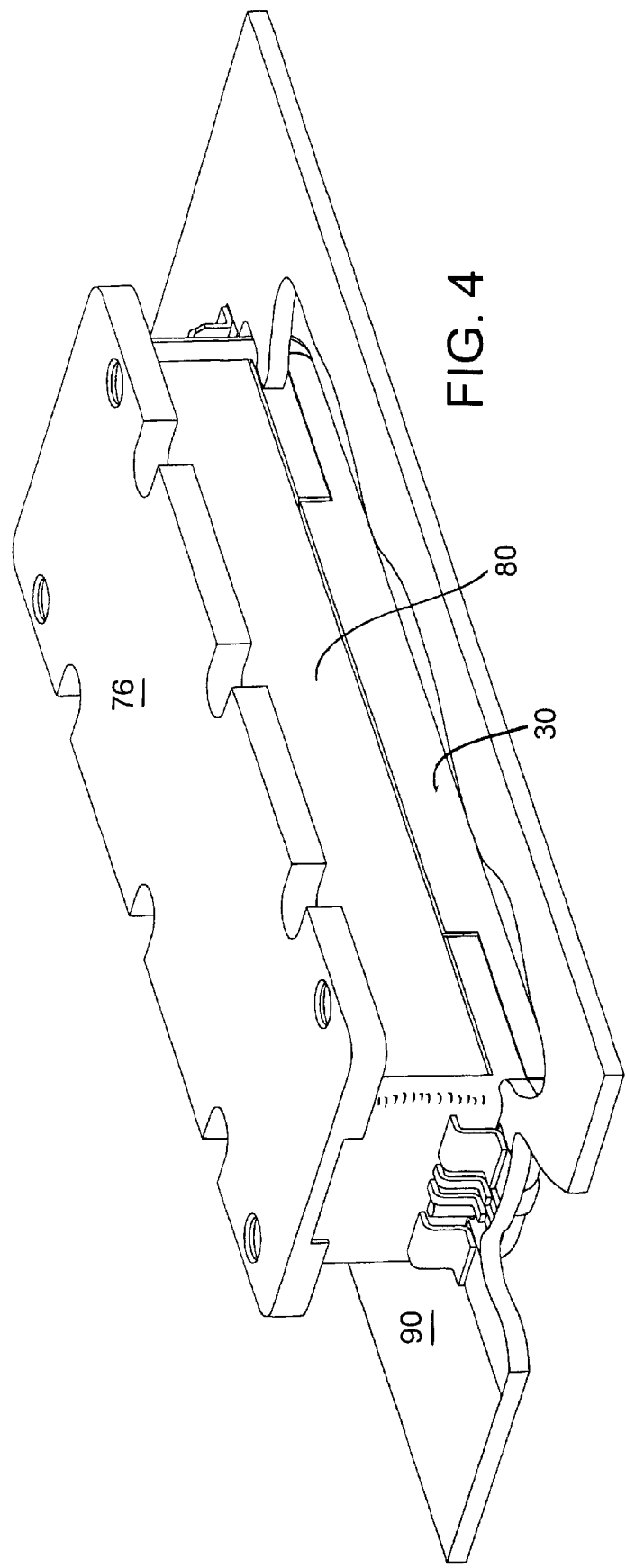
FIG. 4 is a perspective view of a converter mounted in a partially broken-away circuit board.

The heat sink need not cover all four long walls of the converter. For example, in FIG. 4, the lid 30 and the top plate 76 are made of aluminum and the side panels 80, 82 are made of non-metallic material (e.g., the material used to encapsulate the primary and secondary printed circuit boards or a plastic cover). Providing metal heat spreaders e.g. lid 30, top plate 76, in the air streams which flow over both the top and the bottom surfaces of the printed circuit board 90 is a more effective way of removing heat than just having a heat spreader in the air stream on one side of the printed circuit board.

Other embodiments are within the scope of the following claims.

The heat sink and lid need not be made from extrusions. For example, the heat sink could be manufactured by connecting metal fins to a metal base by means of soldering, brazing or use of adhesive (e.g., thermally conductive epoxy). Materials other than aluminum, such as copper or copper alloys, may be used to fabricate the heat sinks and lid and the heat sink, or the parts used to manufacture the heat sink, may be plated with materials other than nickel. Adhesive, epoxy or silicone material may be used to assemble the heat sink to the converter. The lid may be soldered to the heat sink.

What is claimed is:

1. A power converter comprising a housing having an elongated-box shape including two relatively smaller ends and four relatively larger sides, heat-generating electronic circuitry held in the housing, and a heat-conducting metal sheath on the outside of the housing, the heat conducting sheath covering substantially all of the four relatively larger sides comprising two pieces, one of the pieces covering substantially all of three of the relatively larger sides, the other of the pieces covering substantially all of the fourth of the relatively larger sides; and the one piece comprising three separate sub-pieces that are respectively mounted on each of three of the larger sides.

2. The converter of claim 1 in which the metal shields comprise a longitudinally extruded piece that includes fins that run along a length of the housing.

3. The converter of claim 1 in which the metal shields comprise two pieces, one of the pieces covering substantially all of three of the sides, the other of the pieces covering substantially all of the fourth of the sides.

4. The converter of claim 1 wherein at least a portion of the shields comprises a solderable metal surface.

5. The converter of claim 1 further comprising terminals projecting from at least one of the ends and configured to be soldered to conductive runs on a surface of a printed circuit board, and the heat conducting metal shields include a solderable surface configured and oriented to be soldered to the surface of the printed circuit board when the terminals are soldered to the conductive runs.

6. The converter of claim 3 wherein the two opposing sides are the largest of the four sides of the housing.

7. The converter of claim 3 wherein the one piece comprises three separate sub-pieces that are respectively mounted on each of three of the sides.

8. An assembly comprising a circuit board having an aperture, a power converter in the shape of an elongated box, the power converter being mounted on the circuit board with a portion of the power converter lying in the aperture, the power converter having a heat sink that surrounds four longer sides of the elongated box and terminals that project from ends of the power converter and are soldered to conductive runs on the surface of the circuit board, and heat conductive connections between portions of the heat sink and the circuit board.

9. A method comprising making a series of power converters on a manufacturing line, each of the power converters including a heat sink selected from among a set of different available kinds of heat sinks and a core converter, the manufacturing line being configured to enable lot-of-one mixing of power converters in which each power converter in the series may have a different one of the available heat sinks.

10. The method of claim 9 in which the different kinds of heat sinks differ at least by their capacities for sinking heat.

11. The method of claim 9 in which the different kinds of heat sinks differ at least by their sizes.

12. The method of claim 9 in which the core converters of all of the power converters are the same.

13. The method of claim 9 in which the core converters of at least some of the power converters are selected from among different available kinds of converters.

14. A power converter comprising a box-shaped housing having two ends and four sides, heat-generating electronic circuitry held in the housing, heat-conducting metal shields spanning substantially all of two opposing sides of the housing, heat-conducting metal shields spanning at least a portion of the two remaining sides, and a mounting mechanism for attaching the converter to a circuit board in a position in which one of the heat conducting metal shields on one of the opposing sides lies to one side of the circuit board and the other metal shield on the other opposing side lies to the other side of the circuit board.

15. A method for improving heat removal from a power converter having a box-shaped housing having two ends and four sides, heat-generating electronic circuitry held in the housing, heat-conducting shields spanning substantially all of two opposing sides of the housing, heat-conducting metal shields spanning at least a portion of the two remaining sides, and a mounting mechanism for attaching the converter to a substrate in a position in which the heat conducting shield on one of the opposing sides lies to one side of the substrate and the shield on the other opposing side lies to the other side of the substrate, the method comprising providing a substrate having an aperture for accepting the power converter, and mounting the power converter in the aperture using the mounting mechanism.

16. The method of claim 15 in which the substrate comprises a printed circuit board.

17. The method of claim 15 wherein at least one of the heat conducting shields is mounted to the substrate by soldering.

18. The method of claim 15 wherein at least one of the heat conducting shields is mounted to the substrate by thermally conductive adhesive.

19. The method of claim 17 further comprising providing at least one of the heat conducting shields with nickel plating.

20. The method of claim 15 wherein the providing the substrate comprises providing a printed circuit board having a conductive pattern on its surface;

further comprising providing at least one of the heat conducting shields with a surface adapted to be soldered to the printed circuit board; and the mounting comprises soldering the at least one of the heat conducting shields. to the conductive pattern.

* * * * *